S. V. ESSICK.
Hay Loader.
No. 23,911.
Patented May 10, 1859.
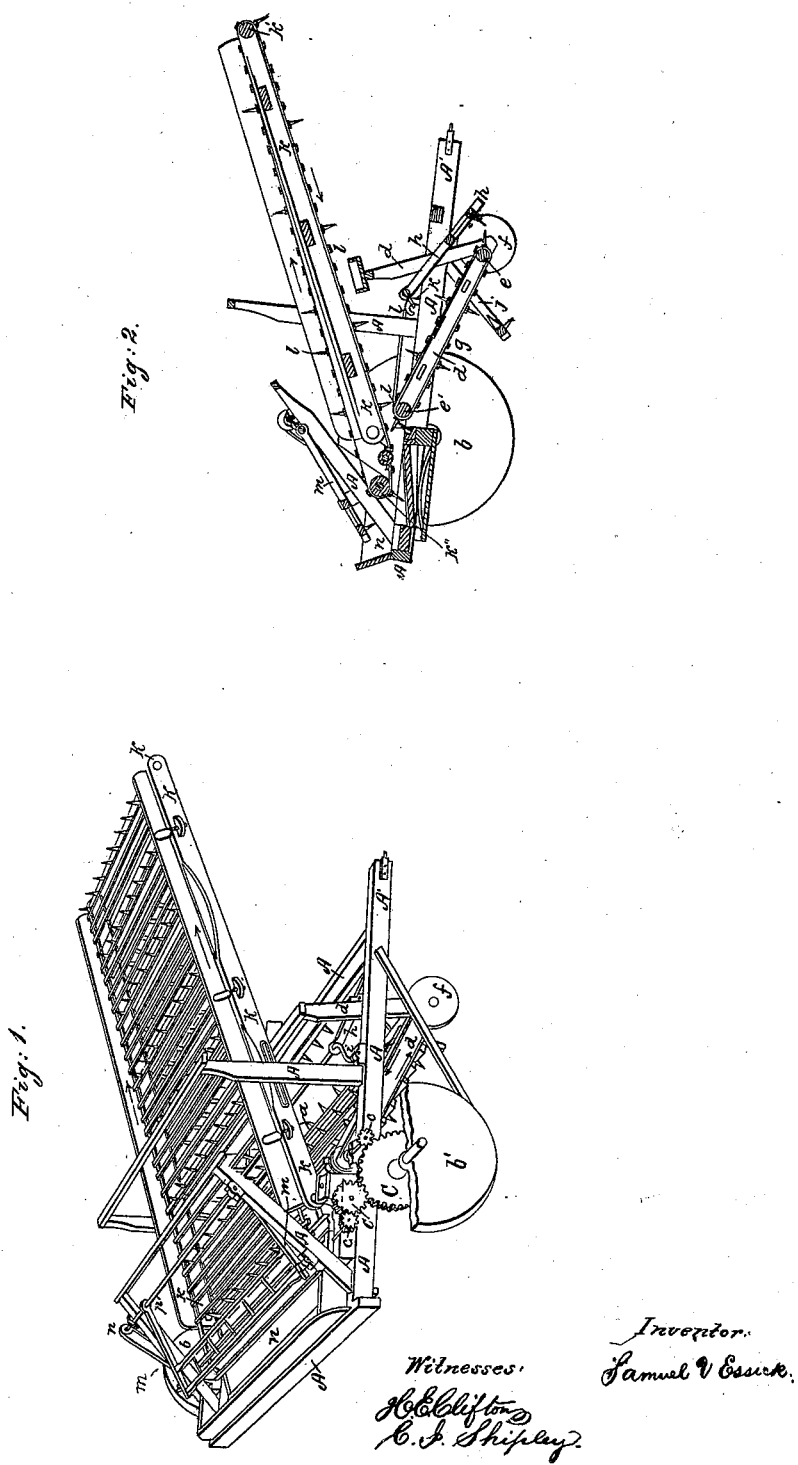

UNITED STATES PATENT OFFICE.

SAMUEL V. ESSICK, OF MOULTREE, OHIO.

IMPROVEMENT IN MACHINES FOR LOADING HAY.

Specification forming part of Letters Patent No. 23,911, dated May 10, 1859.

*To all whom it may concern:*

Be it known that I, SAMUEL V. ESSICK, of Moultree, in the county of Columbiana and State of Ohio, have invented a new and useful Improvement in Machines for Loading Hay; and I do hereby declare that the following is a full and clear description thereof, reference being had to accompanying drawings, and to the letters of reference marked thereon, and made to form a part of this specification.

My invention relates to certain improvements in machinery for loading hay, by means of which hay may be taken from the ground and deposited upon a cart, as hereinafter specified and represented.

In reference to the accompanying drawings, Figure 1 is a perspective view, representing the improved hay-loading machine with all its working parts arranged in order for operation. Fig. 2 is a longitudinal vertical sectional elevation of the machine.

A represents the supporting frame or carriage, provided with wheels $b$ $b'$.

$c$ is a driving cog-wheel attached to the hub of the wheel $b'$, by means of which all the working parts of the machine are made to operate.

$d$ is a frame, provided at its lower end with a roller, $e$, and at its upper end with a rotating shaft, $e'$. Its upper end is pivoted to the carriage A and its lower end supported by wheels $f$, so that the wheels $f$ are adjustable to the uneven surface of the ground without regard to the end A' of the carriage A, which is attached to the cart. Upon this frame $d$, passing around the roller $e$ and shaft $e'$, is arranged an endless conveyer, $g$, provided with toothed ribs.

$h$ is a reciprocating raker, arranged upon the frame $d$ in such manner that in its operation it may take the hay from the ground and deliver it upon the conveyer $g$. This raker receives motion from the shaft $e'$ by means of the band-wheels $i$ $i$ and crank $i'$. Pivoted to the frame or carriage A, and extending below the conveyer $g$, is a rake, $j$, arranged in such manner as to gather any hay that may remain upon the ground after the passage of the reciprocating raker $h$.

Attached to the carriage A, and inclining upwardly, so as to elevate the hay sufficiently for loading, is a frame, $k$, provided at its upper end with a roller, $k'$, and at its lower end with a rotating shaft, $k''$. Passing around the shaft $k''$, from which it derives motion, and around the roller $k'$, is arranged an endless conveyer, $l$, provided with toothed ribs, similar to those of the conveyer $g$. At the foot of the conveyer $l$, upon the carriage A, is arranged a raker, $m$, in such manner as to receive the hay from the body $n$ of the carriage A and deliver it upon the conveyer $l$ for transmission to the cart. This raker $m$ receives motion from the shaft $k''$ by means of band-wheels $p$ $p$ and crank $p'$.

The operation of my invention may be described as follows: The end A' of the carriage being attached to a cart and the machine being made to move in the direction of the arrows, all the working parts of the machine will immediately be set in motion by means of the driving-wheel $c$ and cog-wheel $c'$ $c''$ $c'''$. The hay, being first gathered by hand or otherwise into windrows for the purpose, will be received by the reciprocating raker $h$ and delivered upon the conveyer $g$, by means of which it will be elevated until received by the downward passage of the conveyer $l$, and from thence, by said downward passage of said conveyer $l$, delivered to the body $n$ of the carriage A, where it will be received by the raker $m$ and be deposited upon the conveyer $l$, the upward motion of which will elevate it to the cart for loading.

What I claim as my invention, and desire to secure by Letters Patent, is—

The adjustable frame $d$, the rake $j$, the rakers $h$ and $m$, and the conveyers $g$ and $l$, all arranged and operating substantially as described, for the purposes set forth.

In testimony of which invention I have hereunto set my hand in presence of witnesses.

SAMUEL V. ESSICK.

Attest:
H. E. CLIFTON,
D. O. PERIGO.